(12) United States Patent
Baldridge

(10) Patent No.: US 11,254,595 B2
(45) Date of Patent: Feb. 22, 2022

(54) MICROBUBBLE AERATOR

(71) Applicant: Todd Baldridge, Iowa City, IA (US)

(72) Inventor: Todd Baldridge, Iowa City, IA (US)

(*) Notice: Subject to any disclaimer, the term of this patent is extended or adjusted under 35 U.S.C. 154(b) by 581 days.

(21) Appl. No.: 15/813,991

(22) Filed: Nov. 15, 2017

(65) Prior Publication Data
US 2018/0134596 A1 May 17, 2018

Related U.S. Application Data

(60) Provisional application No. 62/422,292, filed on Nov. 15, 2016.

(51) Int. Cl.
| | | |
|---|---|---|
| *C02F 3/14* | (2006.01) | |
| *B01F 3/04* | (2006.01) | |
| *C02F 3/12* | (2006.01) | |
| *B01F 13/00* | (2006.01) | |
| *C02F 3/20* | (2006.01) | |

(52) U.S. Cl.
CPC ............ *C02F 3/14* (2013.01); *B01F 3/0451* (2013.01); *B01F 3/0473* (2013.01); *B01F 13/004* (2013.01); *B01F 13/0049* (2013.01); *C02F 3/1278* (2013.01); *B01F 2003/04872* (2013.01); *B01F 2003/04879* (2013.01); *B01F 2215/0052* (2013.01); *C02F 3/20* (2013.01); *C02F 2203/008* (2013.01); *Y02W 10/37* (2015.05)

(58) Field of Classification Search
CPC .... B01F 3/0451; B01F 3/0473; B01F 13/004; B01F 13/0049; B01F 2003/04872; B01F 2003/04879; B01F 2215/0052; C02F 3/14; C02F 3/1278; C02F 3/20; C02F 2203/008; C02F 3/26; Y02W 10/37
USPC ............................ 261/29, 36.1, 119.1, 121.1
See application file for complete search history.

(56) References Cited

U.S. PATENT DOCUMENTS

| | | | | | |
|---|---|---|---|---|---|
| 2,825,541 | A * | 3/1958 | Moll | .......................... | C02F 3/20 261/29 |
| 3,662,890 | A * | 5/1972 | Grimshaw | ................. | C02F 3/26 210/195.1 |
| 4,002,561 | A * | 1/1977 | Traverse | ................ | B01F 3/0446 210/621 |
| 4,101,608 | A * | 7/1978 | Bracey | ................. | A01K 63/042 119/215 |
| 4,207,180 | A * | 6/1980 | Chang | .................... | B01F 3/0451 210/180 |
| 4,587,064 | A * | 5/1986 | Blum | ....................... | B63B 35/00 210/242.2 |
| 4,956,080 | A * | 9/1990 | Josefik | ................... | B01F 3/0446 210/109 |
| 5,741,443 | A * | 4/1998 | Gemza | ................. | B01F 3/04099 261/120 |
| 6,322,055 | B1 * | 11/2001 | Speece | ............... | B01D 19/0005 261/123 |
| 7,566,397 | B2 * | 7/2009 | Speece | ................. | B01F 3/04503 210/205 |

(Continued)

*Primary Examiner* — Charles S Bushey
(74) *Attorney, Agent, or Firm* — Shuttleworth & Ingersoll, PLC; Brett D. Papendick

(57) ABSTRACT

An aerating system for treating a waste lagoon or some type of wastewater that captures and recirculates air that has been previously pumped into the lagoon via a skirt. The system also utilizes an oxygen source to pump oxygen into the waste lagoon or wastewater that can also be recirculated. A manifold of the system is designed to have intakes for both the recirculated air and for the oxygen source.

1 Claim, 7 Drawing Sheets

(56) References Cited

U.S. PATENT DOCUMENTS 7,571,899 B2 * 8/2009 Kitasako ............... B01F 1/0022
 210/220
9,248,415 B2 * 2/2016 Osborn .................... C02F 7/00
9,457,327 B2 10/2016 Jacobs

* cited by examiner

MICROBUBBLE AERATOR

CROSS-REFERENCE TO RELATED APPLICATIONS

This application claims priority to U.S. Provisional Application No. 62/422,292 filed on Nov. 15, 2016, the contents of which are hereby incorporated by reference herein.

BACKGROUND OF THE INVENTION

The present invention relates to wastewater aeration generally and waste lagoons specifically. By aerating waste lagoons, oxygen is introduced into the water which allows for an aerobic environment. The aeration allows the lagoon to be supplied with required oxygen to metabolizing microorganisms and to provide mixing so that the metabolizing microorganisms come into contact with both dissolved and suspended organic matter.

Presently, mechanical surface aerators can be used to both mix the lagoon water and provide air into the lagoon water. Typically, these types of aerators are tied to shore and float on the surface of the liquid being aerated. The aerators typically include a means for delivering a supply of air down into some distance into the liquid to be treated. The means could be an air pump or the utilization of differences in pressure to move the air in a particular direction. A portion of the air is dissolved in the liquid, while another portion returns to the surface. Depending on the size of the waste lagoon, multiple units can be utilized to treat the liquid. Current aerators do not have the ability to recirculate air that resurfaces around the floating aerator or in locations where the air is added to the wastewater.

It is an object of the invention to provide an aerator with a skirt and a manifold to recirculate air that reaches the surface of the liquid.

It is further an object of the invention to provide an aerator that can be connected to an oxygen source.

SUMMARY OF THE INVENTION

The present invention is an aerating system for a waste lagoon or other wastewater that allows for air to be recirculated. Other wastewater can be septic tanks, sewage plants, and holding ponds. Accordingly, the use of an oxygen source can be utilized as the capture of air returning to the liquid surface reduces the amount of oxygen that is unused by the system. A means for directing air downward into the liquid such as an air pump or utilization of appropriate pressure gradients is fitted to a float along with a power cord to power the means for directing the air. The preferred embodiment uses the aerator described in U.S. Pat. No. 9,457,327.

A manifold with a plurality of intake members is attached near the air pump. At least one of the intake members is connected to a chamber of a skirt that extends laterally from the float as well as extends vertically downward past the surface of the liquid being treated. A second intake member is attached to the oxygen source. It is to be understood that in other embodiments, the skirt could be modified such that it does not extend laterally, but instead utilizes a chamber below the liquid surface to recirculate at least a portion of the air that has or has begun to ascend to the surface of the liquid. Additionally, elements other than oxygen can be introduced into the system by providing a source of those elements and connecting it to the intake members.

Both the air from the chamber and the oxygen source are directed to the air pump and are forced downward and out an exit channel where they enter the liquid. While some of the air and oxygen dissolves in the liquid, a portion of the air and oxygen returns to the surface. Some of the resurfacing air and oxygen will be captured by the chamber of the skirt and be recirculated to the air pump. Additionally, the recirculation allows smaller air and oxygen bubbles to be generated which have a greater chance of staying in the liquid rather than resurface.

An alternative form of the aerating system is one that can be permanently attached to a location near the wastewater that is to be treated, but preferably the aerating system is portable and located on a trailer of a semi-truck. The aerating system includes a tank with a water input member and a water output member. A water pump moves wastewater from a wastewater lagoon or similar structure through a passageway such as tubing to the water input member and into the tank. A similar device as described in the first embodiment is used in conjunction with the tank. Specifically, a motor mounted on a base with an exit channel is mounted on the tank. The system includes a manifold for supplying oxygen to the exit channel and then to the liquid in the tank. An oxygen source then adds oxygen to the tank. Water then exits out the water output member which can be an opening in the bottom of the tank and is returned to the source of the wastewater. Preferably the tank is confined such that a portion of the oxygen that is added to the tank that resurfaces within the tank will be able to be utilized again in the treatment of the liquid in the tank. As in the first embodiment, the embodiment with the tank can have varying passageways and manifolds to achieve the desired effect.

BRIEF DESCRIPTION OF THE SEVERAL VIEWS OF THE DRAWING(S)

DETAILED DESCRIPTION OF THE INVENTION

Figure 1:
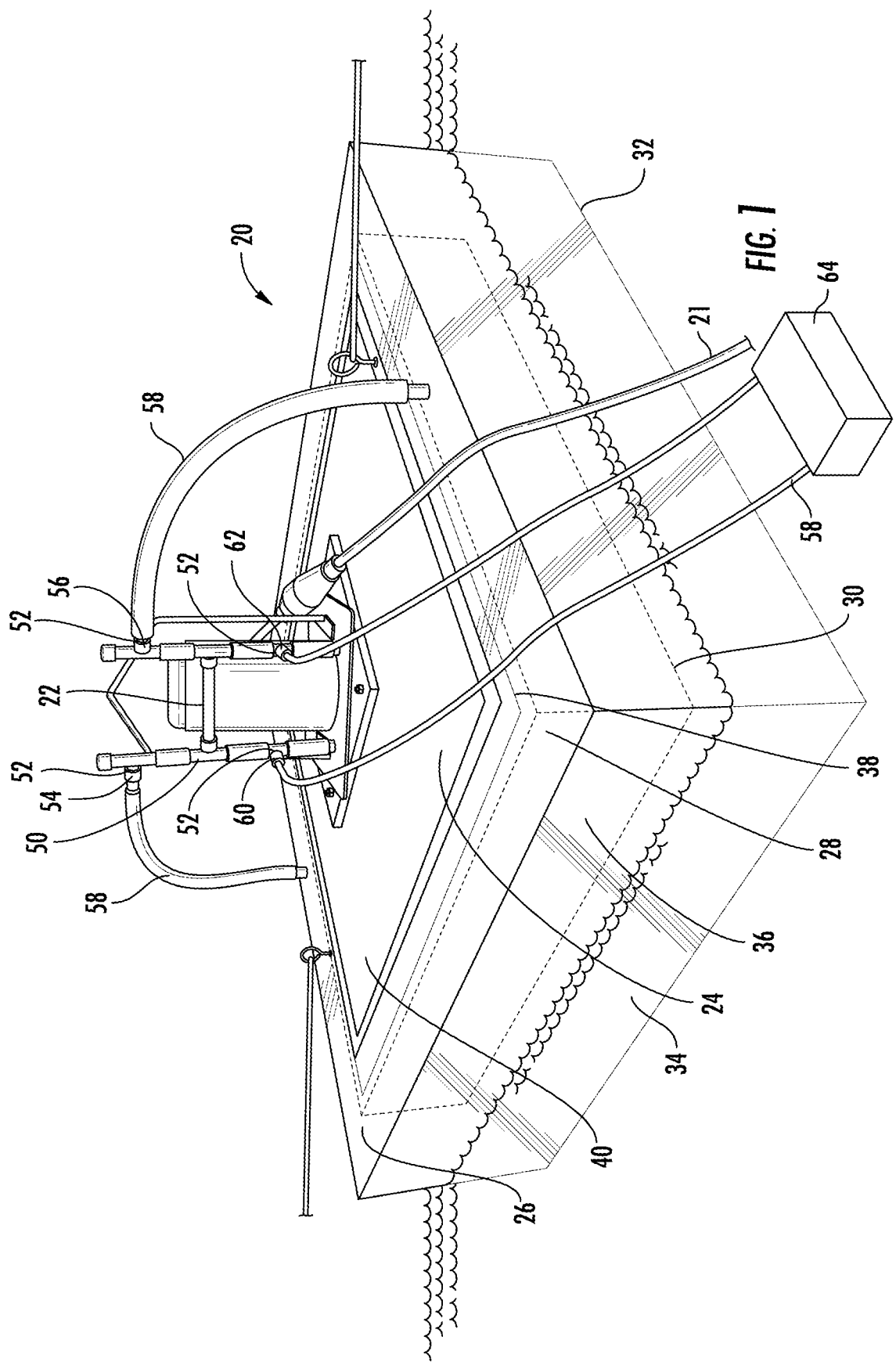
FIG. 1 is a perspective view of the preferred embodiment of an aerating system.

FIG. 1 shows an aerating system 20 comprising a motor 22 mounted on a floatation member 24. The motor 22 is powered by an outside source, typically electricity, via a power cord 21. The aerating system further comprises a skirt 26 that extends laterally from the flotation member 24. Additionally, the skirt 26 has an upper portion 28 that is substantially horizontal and a descending wall 30 that is substantially vertical and substantially perpendicular to the upper portion 28. A bottom 32 of the descending wall 30 extends past a bottom of the floating member 24.

A chamber 34 is formed between the descending wall 30 and a side 36 of the flotation member 24. As the preferred embodiment has a flotation member 24 and skirt 26 that are rectangular, the preferred embodiment has a chamber 34 that is present on all four sides of the flotation member 24. At least one seal 38 is positioned between the upper portion 28 of the skirt 26 and a top 40 of the flotation member 24 in order to maintain an airtight seal.

Figure 2:
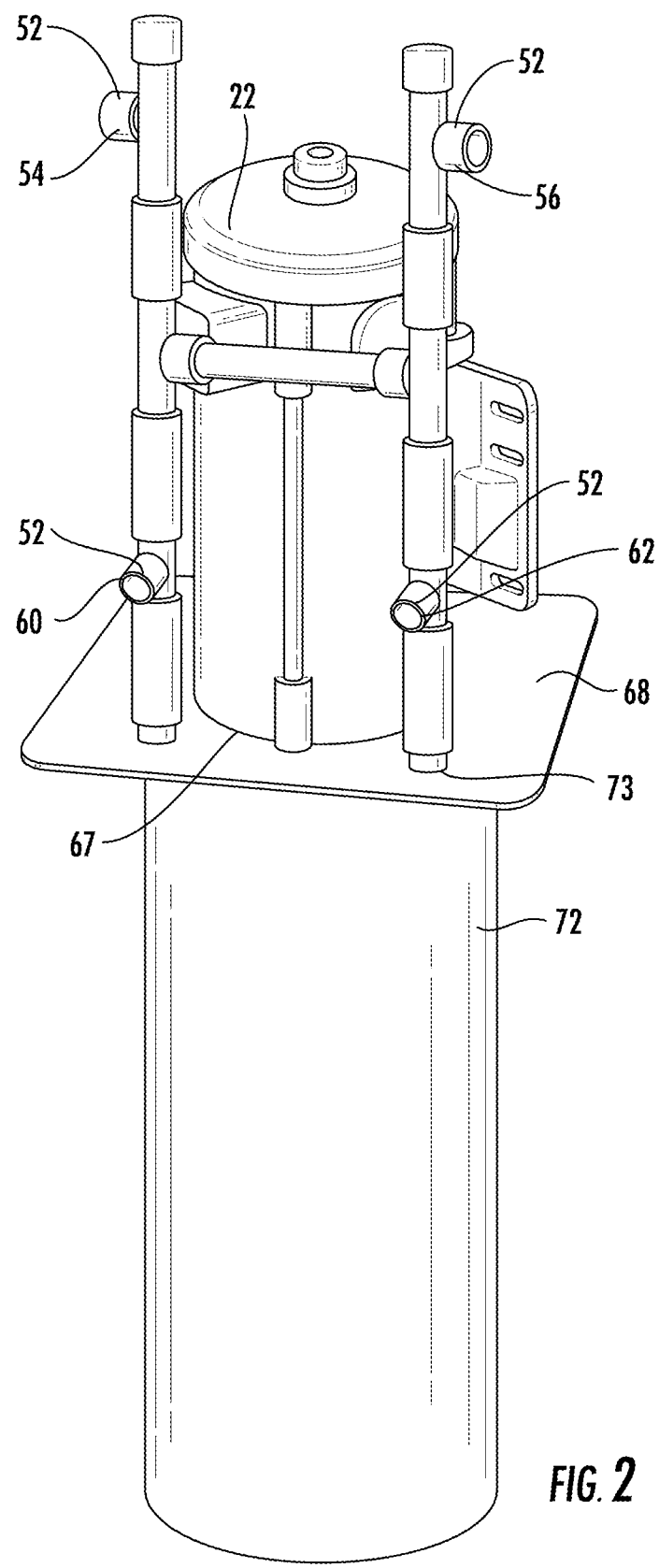
FIG. 2 is a perspective view of the air movement means, manifold and exit channel.

As shown in FIGS. 1 and 2, a manifold 50 comprises a plurality of intake members 52. In the preferred embodiment, the manifold 50 has four intake members 52. A first set of intake members include a first intake member 54 and a second intake member 56 and each are connected via a passageway 58 to the skirt 26. The passageways 58 are in communication with the chamber 34. A second set of intake members include a third intake member 60 and a fourth intake member 62 and each are connected to an oxygen source 64 via another set of passageways 58. The passageways 58 leading to the third intake member 60 and fourth intake member 62 do not lead to the skirt 26, rather these are connected to the oxygen source 64, which is preferably an oxygenator.

As best seen in FIG. 2, a second end 67 of the motor 22 is mounted on a base 68. There is at least one opening 73 in the base 68 that is in communication with an exit channel 72 that is substantially hollow. The recirculated air and oxygen from the oxygen source 64 are routed through openings 73 in the base 68 and then into the exit channel 72. As shown in FIG. 1, a platform 74 is placed between the base 68 and the flotation member 24. The platform 74 can be made of a material that absorbs some of the forces generated when the aerating system 20 is in use, accordingly the platform 74 can act as a vibration dampener. The motor 22 is connected to a power source via an electric cord.

Figure 3:
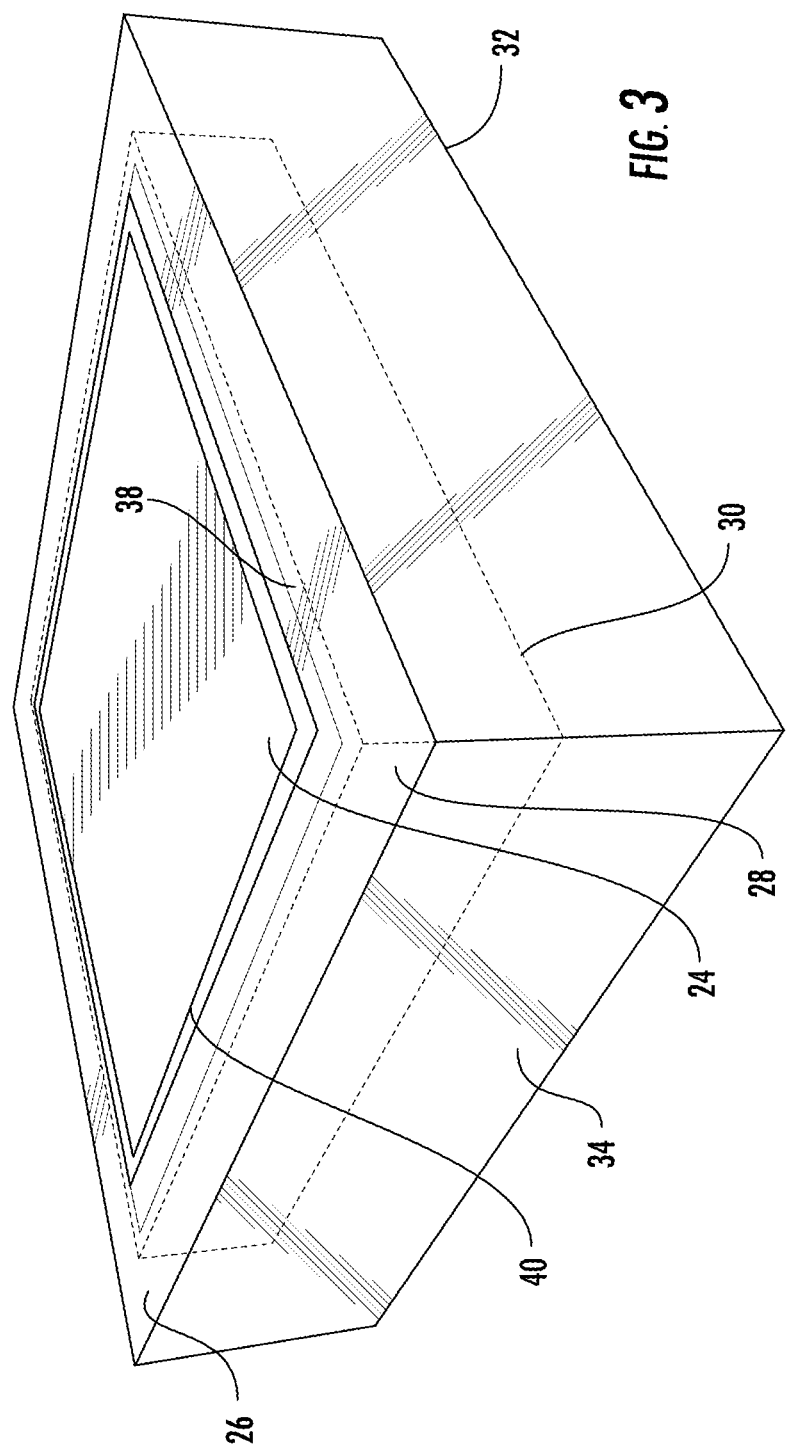
FIG. 3 is a perspective view of the skirt and floating member.
Figure 4:
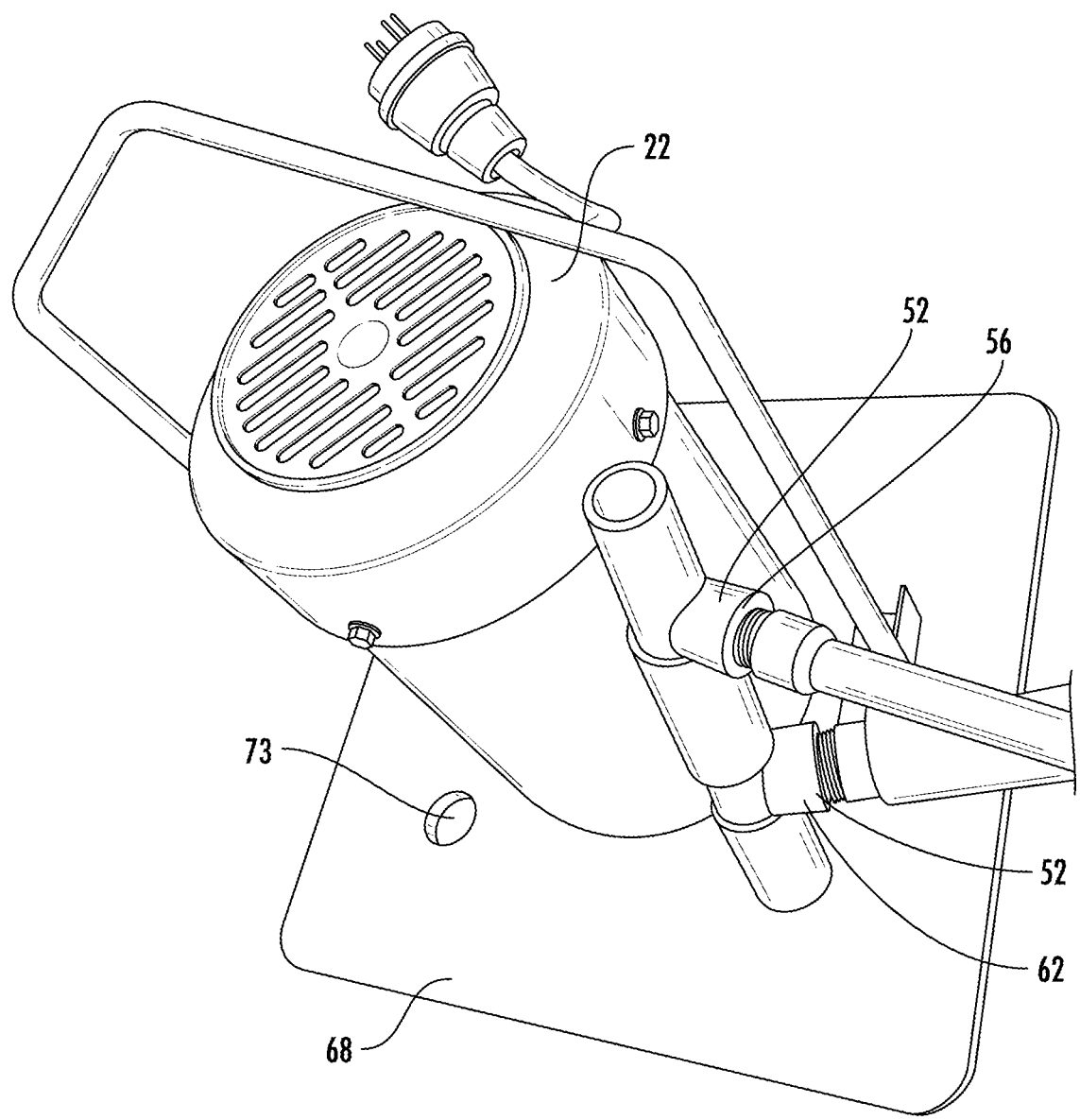
FIG. 4 is a perspective view of the manifold on the motor.

FIGS. 3 and 4 show the parts of the aerating system 20 in greater detail. While the preferred embodiment is shown in these figures, there are several ways to vary the parts including manifold 50, skirt 26 and flotation member 24 and obtain similar results. Similarly, the aerating system 20 could be made with only intakes connected to the skirt 26 and in communication with the chamber 34 and not to the oxygen source 64. Furthermore, a solar panel could be mounted to the aerating system 20 to power the motor 22 or the solar panel could be mounted on land and connected to the air pump 22 via the power cord 21.

Figure 5:
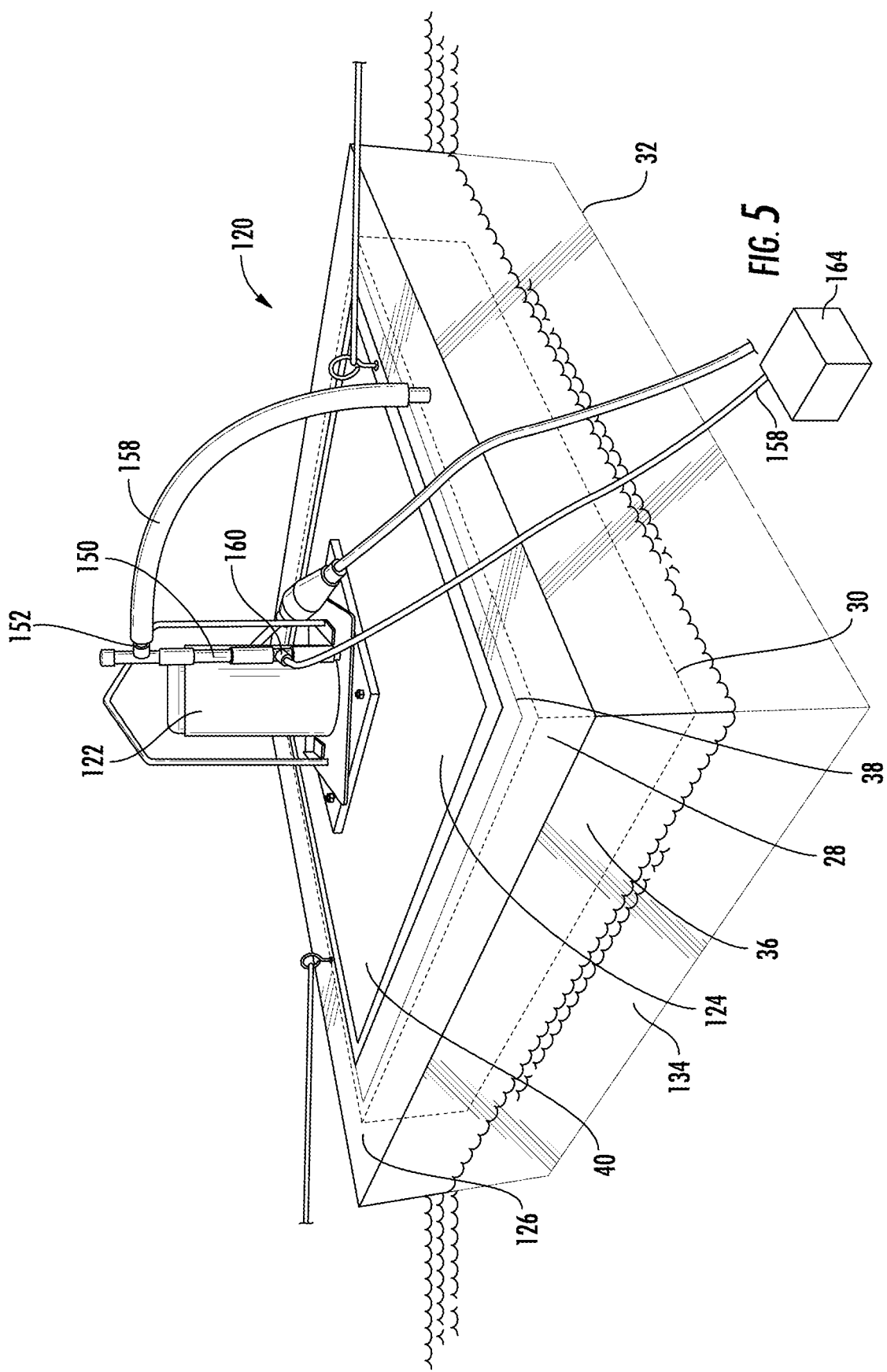
FIG. 5 is a second embodiment of the aerating system showing a different configuration of the manifold.

FIG. 5 shows a second embodiment of an aerating system 120 wherein a manifold 150 is similar to the manifold 50 in the first embodiment described above. It is set up similarly to the aerating system 20 and has a flotation member 124, skirt 126, and motor 122. The main difference is that the manifold 150 has a first intake member of 152 that is in communication with a chamber 134 via passageway 158, and has only a single second intake member 160 connected to an oxygen source 164. This second embodiment is meant to demonstrate that several styles of manifolds can be used. Additionally, one or more of the passageways 58 or 158 could be eliminated or added. The additional part numbers in FIG. 5 correspond to the part numbers in FIG. 1.

In operation of the preferred embodiment, the motor 22 is connected to a power source and turned on. As the motor 22 powers a means to lower the air pressure in the exit channel 72, the recirculated air and oxygen from the oxygen source is drawn through the openings 73 in the base 68 and directed downward via the exit channel 72 and into the liquid to be treated by the system 20. The air pressures involved allow air trapped in the chamber 34 and oxygen from the oxygen source to be forced into the exit channel 72 via the manifold 50. As the system 20 runs, a portion of the air and oxygen that is pumped into the liquid (such as a waste lagoon) will resurface to the surface of the liquid. Furthermore, a portion of the resurfacing air and oxygen will resurface within the chamber 34. The air and oxygen resurfacing in the chamber 34 will be forced through the passageways 58 that lead from the skirt 26 to the intake members 54 and 56. That air and oxygen is then forced downward again and the process repeats itself. Oxygen is also fed to the manifold 50 via passageways 58 that lead from the oxygen source 64 to the intake members 60 and 62. The oxygen can be metered to control the flow and use of the amount of oxygen by the system 20. Additionally, a side of the skirt could be fitted with a hinge that allows the top of the skirt to open when a certain predetermined air pressure is exceeded in the chamber, basically allowing the system to "burp" itself.

Testing of the system 20 on a waste lagoon indicates a significant increase in the oxygen content of the liquid. In testing, a 3000 gallon pool had a beginning dissolved oxygen content of zero parts per million (ppm). After running the system without an oxygen source for ninety minutes, the dissolved oxygen content was 8 ppm. A similar test, this time with an oxygen source brought the dissolved oxygen content to 8 ppm in only ten minutes and reached 20 ppm in thirty minutes. The reason is that more microbubbles can be produced by the system 20 and the microbubbles do not resurface, rather they stay within the liquid being treated and are available for microorganisms in the liquid being treated. The increased oxygen content means that less aeration systems are needed on a particular waste lagoon or wastewater. Initial testing indicates that the number of systems could be cut by 80 percent. For example, a waste lagoon requiring thirty prior art aeration systems could be treated by six of the aerating systems 20. The use of fewer systems saves costs to the end user in terms of the number of units needed to be purchased as well as savings in electrical costs.

Figure 6:
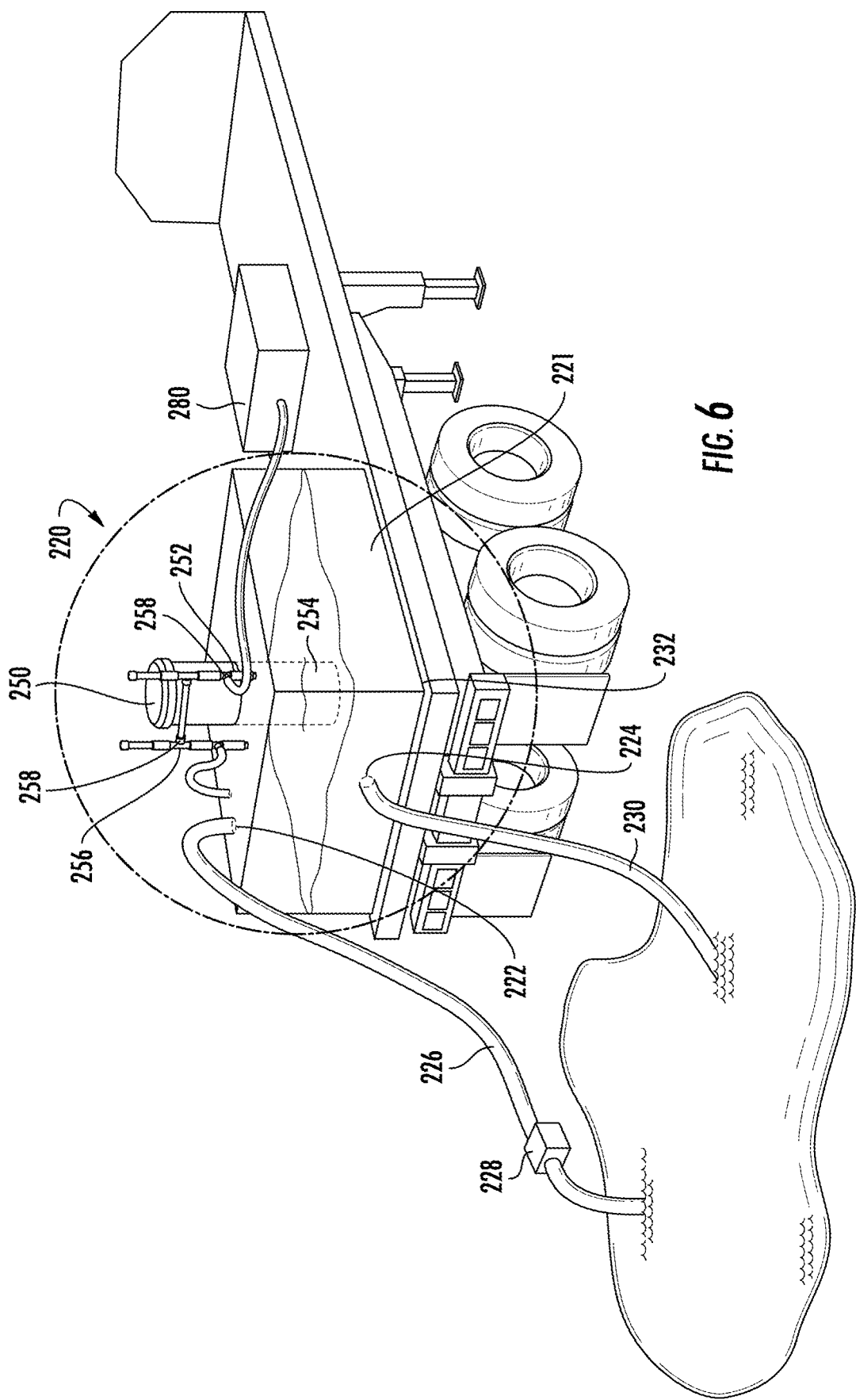
FIG. 6 is a third embodiment of the aerating system in which the system is located on a trailer of a semi.
Figure 7:
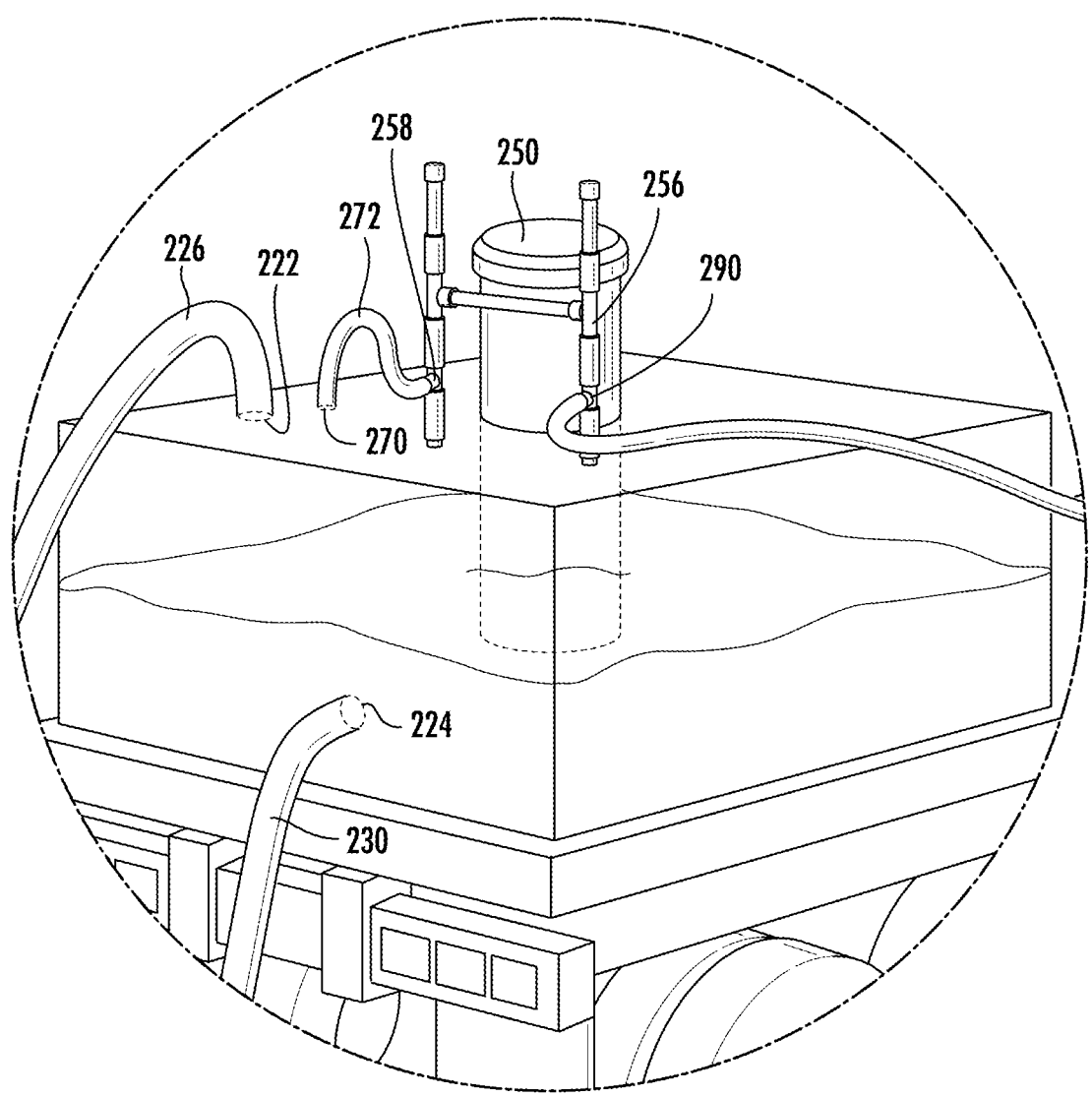
FIG. 7 is a perspective of the third embodiment's tank.

A third embodiment of the invention is detailed in FIGS. 6 and 7. An aerating system 220 comprises a tank 221. The tank 221 is placed near a location where there is wastewater source to be treated, such as a waste lagoon. Preferably the tank 221 is positioned on a movable structure such as the bed of a trailer of a semi. The tank 221 has a first opening 222 and a second opening 224. A first linkage member 226 links the first opening 222 to the wastewater source. The first linkage member 226 can be flexible piping. A water pump 228 pumps water from the wastewater source to the tank 221 via the first linkage member 226 and the first opening 222. A second linkage member 230 connects the tank 221 back to the wastewater source. Preferably the tank 221 has the second opening 224 located on the bottom 232 of the tank 221. The liquid in the tank 221 exits the second opening 224 via gravity and pressure and is pumped through the second linkage member 230 which is preferably flexible piping and back to the wastewater source.

The aerating system 220 utilizes a similar motor and manifold system as the ones described in the other embodiments. Specifically, the system 220 further comprises a motor 250 mounted on a base 252. An exit channel 254 is located on the opposite side of the base than the motor 250. A manifold 256 is mounted on the base 252 and preferably has a plurality of intake members 258. Similar to the previous embodiments, the intake members 258 can bring oxygen and recirculated air back to the exit channel 254 and thus into the liquid in the tank 221. The confined tank 221 acts as the skirt of the other embodiments.

In operation, liquid from the wastewater source is pumped into the tank 221. At the same time, the motor 250 pumps air through the exit channel 254 and into the liquid contained in the tank 221. As some of the air pumped into the tank 221 rises, it exits a third opening 270 of the tank 221 and goes through a passageway 272 that leads to an intake member 258 of the manifold 256. The manifold 256 then is in communication with the exit channel 254 such that the air can be recirculated into the liquid. Preferably, an oxygen source 280 is connected to a second intake member 290 of the manifold 256 such that oxygen can be supplied to the system. A portion of the liquid in the tank 221 exits through the second opening 224 and is returned to the wastewater source. As in the other embodiments, variable numbers of intake members can be utilized in the third embodiment.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

I claim:

1. An aerating system for treating wastewater, comprising:
    a water pump;
    a tank for holding a liquid;
    wherein the water pump pumps wastewater from a first location to the tank;
    the tank is configured to be placed a distance away from the first location;
    an air pump;
    wherein the air pump directs air into the liquid of the tank;
    an oxygen source;
    the oxygen source is separate from the air;
    the oxygen source is pure oxygen;
    wherein oxygen is directed into the liquid of the tank;
    the tank comprising an output member wherein the liquid exits the tank;
    a linkage member connecting the output member to the first location of the wastewater;
    wherein the wastewater is pumped from the first location to the tank and then back to the first location;
    a manifold connected to the tank;
    the manifold having a first intake member;
    the manifold having a second intake member;
    wherein the oxygen source is connected to the second intake member;
    wherein oxygen is circulated into the tank via the second intake member;
    a portion of the air and oxygen supplied to the tank exits the tank and is directed to the first intake member of the manifold;
    wherein the portion is recirculated in the aerating system.

* * * * *